(12) United States Patent
Esterberg et al.

(10) Patent No.: US 6,366,572 B1
(45) Date of Patent: Apr. 2, 2002

(54) WIRELESS COMMUNICATION SYSTEM WITH SYMMETRIC COMMUNICATION PROTOCOL

(75) Inventors: Aanand Esterberg, Seattle; Jyun-Cheng Chen; Ali Akrouf, both of Bellevue, all of WA (US)

(73) Assignee: Senora Trading Company, Dubai (AE)

( * ) Notice: Subject to any disclaimer, the term of this patent is extended or adjusted under 35 U.S.C. 154(b) by 0 days.

(21) Appl. No.: 09/244,572

(22) Filed: Feb. 4, 1999

(51) Int. Cl.$^7$ ................. H04B 7/216; H04B 7/208; H04L 12/413; H04Q 7/20
(52) U.S. Cl. ................ 370/343; 370/335; 370/344; 370/445; 455/446; 455/507
(58) Field of Search ................. 370/343, 335, 370/344, 445, 473, 329, 331, 278, 310, 318, 321; 455/446, 507, 524, 455, 500, 501, 504, 505

(56) References Cited

U.S. PATENT DOCUMENTS

| | | | | |
|---|---|---|---|---|
| 3,925,782 A | * | 12/1975 | Anderl et al. | 455/507 |
| 4,261,054 A | * | 4/1981 | Scharla-Nielsen | 455/13.4 |
| 5,265,119 A | * | 11/1993 | Gilhousen et al. | 370/335 |
| 5,265,262 A | * | 11/1993 | Wheatley, III et al. | 455/522 |
| 5,461,639 A | * | 10/1995 | Wheatley, III et al. | 370/342 |
| 5,485,486 A | * | 1/1996 | Gilhousen et al. | 370/335 |
| 5,901,354 A | * | 5/1999 | Menich et al. | 455/442 |
| 5,995,496 A | * | 11/1999 | Honkasalo et al. | 370/318 |

* cited by examiner

Primary Examiner—Wellington Chin
Assistant Examiner—M. Phan
(74) Attorney, Agent, or Firm—Michael J. Donohue; Seed IP Law Group, PLLC (57) ABSTRACT

A symmetrical communication protocol allows handsets to operate as a master unit or a slave unit and operate independently of any base station. Remote units may contact each other directly with the calling unit being temporarily designated as a master unit and the called unit being designated temporarily as a slave unit. A wireless communication link is established between the two units and the units frequency-hop in synchronization in accordance with FCC requirements. The units independently monitor the signal strength of the incoming signal and can transmit power change commands to the other unit to increase or decrease transmission power as required. A calling unit initially transmits a call request on a limited number of the available frequency channels in order to decrease the acquisition time period. An idle unit has a sleep cycle and an awake cycle. When entering the awake cycle, the idle unit is programmed for operation at one of the acquisition channels and monitors for an incoming data frame intended for that unit. If a data frame is not detected, the unit returns to the sleep cycle. If a data frame is detected, the handsets synchronize and communicate over the entire range of operational frequency channels utilizing a predetermined pseudo-random sequence.

33 Claims, 8 Drawing Sheets

| SYNCHRONIZATION PATTERN | RANDOM NO. GENERATOR STATE | ID CODE | MESSAGE FIELD |
|---|---|---|---|

*FIG. 4A*

| VOICE DATA | MESSAGE FIELD |
|---|---|

WIRELESS COMMUNICATION SYSTEM WITH SYMMETRIC COMMUNICATION PROTOCOL

TECHNICAL FIELD

The present invention is generally directed to wireless communication systems and, more particularly, to a system and method for wireless communication using a symmetric communications protocol.

BACKGROUND OF THE INVENTION

Wireless communication takes many forms ranging from two-way radios to cellular/PCS communication systems. The particular communication protocol depends on the specific wireless communication technology. For example, a cordless telephone, such as commonly used by consumers, comprises a base station and a single handset. The base station and handset communicate with each other on a preassigned frequency band. The base station is coupled to a public switched telephone network (PSTN) and functions as a master unit. The single handset function functions as a slave unit under the control of the master unit. With this communication protocol, the base station master unit generally transmits at full power and may send commands to the handset slave unit to control its transmission power.

Other communication systems, such as two-way radio systems, have no communication protocol. In these systems, one radio unit transmits and one or more radio units receive the transmitted message. The transmitting radio unit is activated by a pushed talk button, voice activated relay, or other conventional component. If transmitters in two radio units are activated simultaneously, a "collision" occurs with the resulting interference making reception difficult or impossible for the remaining receiving radio units.

In other communication systems, such as a specialized mobile radio (SMR), manufactured by companies such as Nextel, and Cellular/PCS systems, a base station communicates with one or more subscriber hand sets. The master-slave relationship in this type of communication system is fixed. That is, the base station always functions as the master unit and also serves as a gateway to the PSTN while the subscriber handsets function as slave units. With the master-slave communication arrangement described above, all communications must flow through the master unit. Thus, the master unit functions as a repeater when one slave unit communicates with another slave unit and functions as a gateway to the PSTN when one slave unit wishes to communicate via the PSTN.

The fixed master-slave relationship creates significant communication problems under certain conditions. For example, all slave units must be within range of the master unit to communicate with each other. Thus, communication between two slave units is impossible if one or both of the slave units are out of communication range of the master unit. This is true even when the slave units are within communication range of each other. Additional problems occur because the master unit typically transmits at maximum power levels. Such high signal levels can overload the low noise amplifier (LNA) and the radio frequency (RF) front end of nearby slave units. Such overloading renders the slave units incapable of communicating with other slave units that may be transmitting at low signal levels.

Therefore, it can be appreciated that there is a significant need for a communication system that eliminates the fixed master-slave relationship and its attending shortcomings. The present invention provides this and other advantages as will be apparent from the following description and accompanying figures.

SUMMARY OF THE INVENTION

The present invention is embodied in a system and method for symmetric communication protocol between two wireless communication units. The protocol does not require operation of a base station that is permanently designated as a master unit or the operation of remote units that are permanently designated as slave units. Instead, the calling unit is temporarily designated as a master unit and the called unit is designated as the slave. The calling unit and called unit both include signal monitors to monitor and determine the strength of received signals. If the received signal is above or below predetermined sets of limits, the wireless unit may transmit a power change request signal to the other unit.

The system may further include a base station coupled to a telephone network to permit wireless units to communicate with the telephone network via the base station. In an exemplary embodiment, the base station may be coupled to a public switched telephone network (PSTN) to allow units to communicate via the PSTN.

The units are programmed for operation at multiple frequencies. In an exemplary embodiment, a first unit transmits a request to communicate with a second unit using a selected subset of the operational frequencies. The second unit monitors at least one channel of the selected subset to detect the request to communicate. When a communication link is established between the units, the communication occurs over the entire set of operational frequencies. In one embodiment, the operational frequencies are selected in accordance with a pseudo-random sequence such that both units are programmed for operation in accordance with the pseudo-random sequence.

The initial communication may include a plurality of control data frames containing data to allow synchronization between the first and second units and to allow exchange of data relating to the pseudo-random sequence. The data frame also includes identification data indicating the second unit as a called party.

When a wireless communication link has been established, voice communications may occur bi-directionally using a plurality of message data frames. The message data frames include a provision for transmitting the power change request signal.

DETAILED DESCRIPTION OF THE INVENTION

The present invention is directed to a wireless communication system and communication protocol that permits direct communication between mobile handsets without the control, or any intervention, from a base station. This is unlike other forms of communication, such as a cellular telephone system, in which a base station functions as a form of repeater to receive communication from one mobile handset and relay that information to a second mobile handset. With the existing technology, two cellular telephones do not communicate directly with each other even if they are in the same room. Rather, each cellular telephone transmits its voice data to a base station which relays the voice data to the other cellular telephone. In addition, the base station may transmit additional data to the cellular telephones to increase or decrease the transmit power of the cellular telephone. If both cellular telephones are far from the base station, the telephones may be operating at maximum transmission power even though they are at the same location. Thus, the cellular telephones are incapable of direct communication with each other or direct control of each other.

Because the base station controls the communication between the individual handsets, the base station may be considered a "master" unit while each of the mobile handsets may be considered a "slave" unit. Any wireless communication system that requires communication via a base station has the inherent disadvantage that the base station must be involved in all communications. If one handset is out of communication range of the base station, that handset cannot communicate with other handsets even if it is within communication range of other handsets.

In contrast, the present invention allows direct communication between mobile handsets without any intervention by a base station. Using the communication protocol of the present invention, two mobile handsets communicate with each other by establishing a temporary master-slave relationship based on which handset is the calling party and which is the called party.

Figure 1:
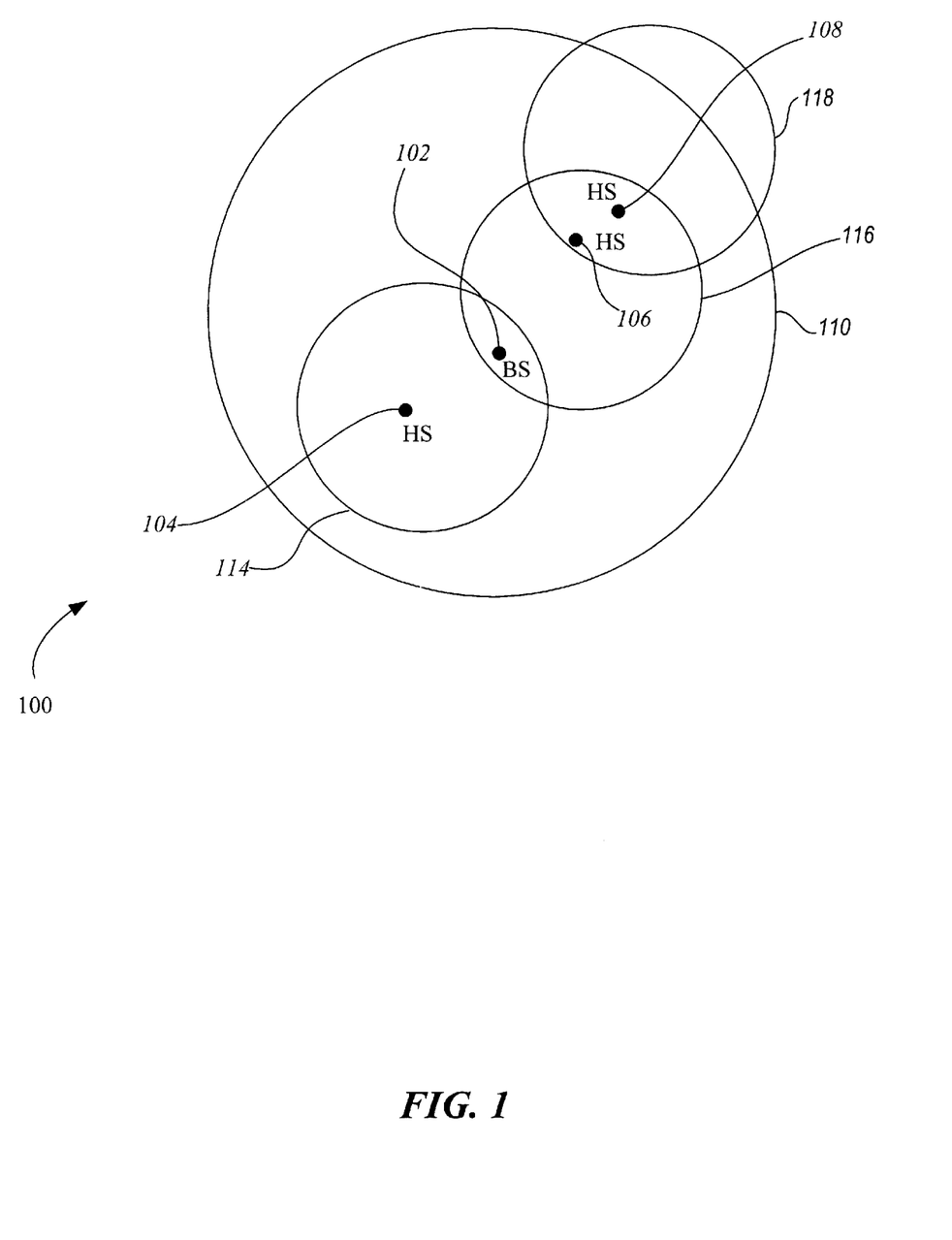
FIG. 1 illustrates relative areas of communication coverage by a base station and a plurality of handsets.

The present invention is embodied in a system 100, illustrated in FIG. 1. In a preferred embodiment, the system 100 includes a base station 102 to permit communication with an external network (see FIG. 2). In addition to the base station 102, the system 100 includes a plurality of handsets. For the sake of clarity, FIG. 1 illustrates only three handsets 104, 106, and 108. The base station 102 has a substantially circular area of coverage 110 while each of the handsets 104–108 have substantially circular areas of coverage 114, 116, and 118, respectively.

The areas of coverage illustrated in FIG. 1 may be used to point out the shortcomings of the existing technology. In FIG. 1, the handset 108 has an area of coverage 118 that includes the handset 106, but does not include the base station 102. In accordance with the prior art, the handset 108 cannot communicate directly with the handset 106 and is therefore incapable of communicating with any handset since the handset 108 is not in communication range with the base station 102 and all communications must be relayed through the base station.

Figure 2:
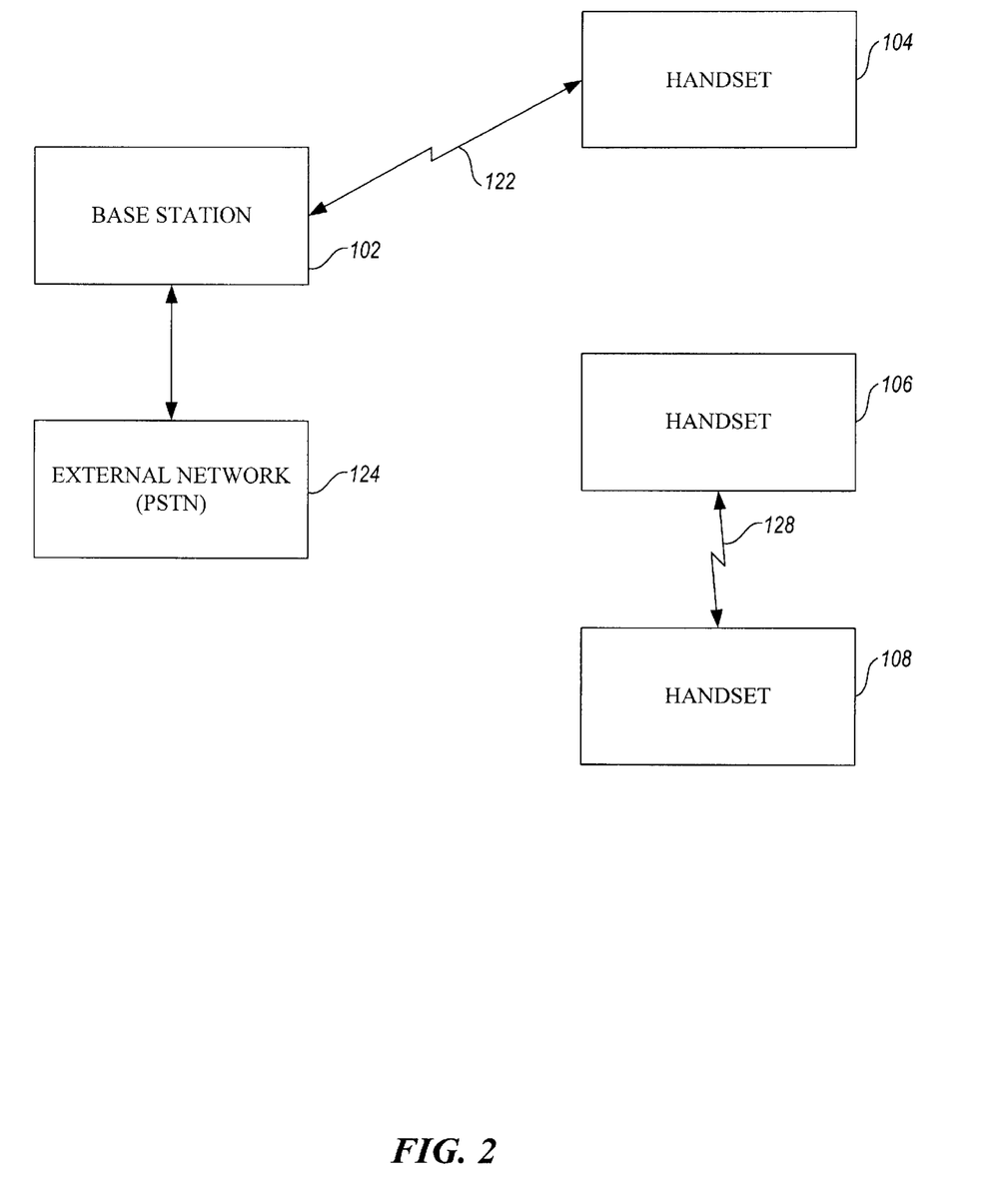
FIG. 2 is a functional block diagram illustrating communication between a base station and a handset and illustrating communication directly between two handsets.

In contrast, the system 100 permits direct communication between the handsets 106 and 108. FIG. 2 illustrates such a connection. A wireless communication link 128 allows direct communication between the handset 106 and the handset 108. Such communication does not involve the base station 102. Details of the circuit elements and communication protocol that allow such direct communication will be described in detail below. Communication with the base station 102 is only required under certain circumstances, such as using the base station to communicate with an outside network. FIG. 2 also illustrates a connection between the handset 104 and the base station 102. The handset 104 is coupled to the base station 102 via a wireless communication link 122. In turn, the base station 102 is coupled to an external network 124, such as a public switched telephone network (PSTN), PBX, or the like. The present invention is not limited by the specific form of the external network 124.

In accordance with the principles of the present invention, the base station 102 is not always the master unit. The base station 102 and the mobile handsets 104–108 are each capable of operation as the master unit or the slave unit. The only feature that distinguishes the base station 102 from any of the handsets 104–108 is that the base station is coupled to the external network 124 and serves as a gateway thereto. The base station 102 may also have greater transmitter power than the handsets 104–108, although this feature is not essential to satisfactory operation of the system.

Figure 3:
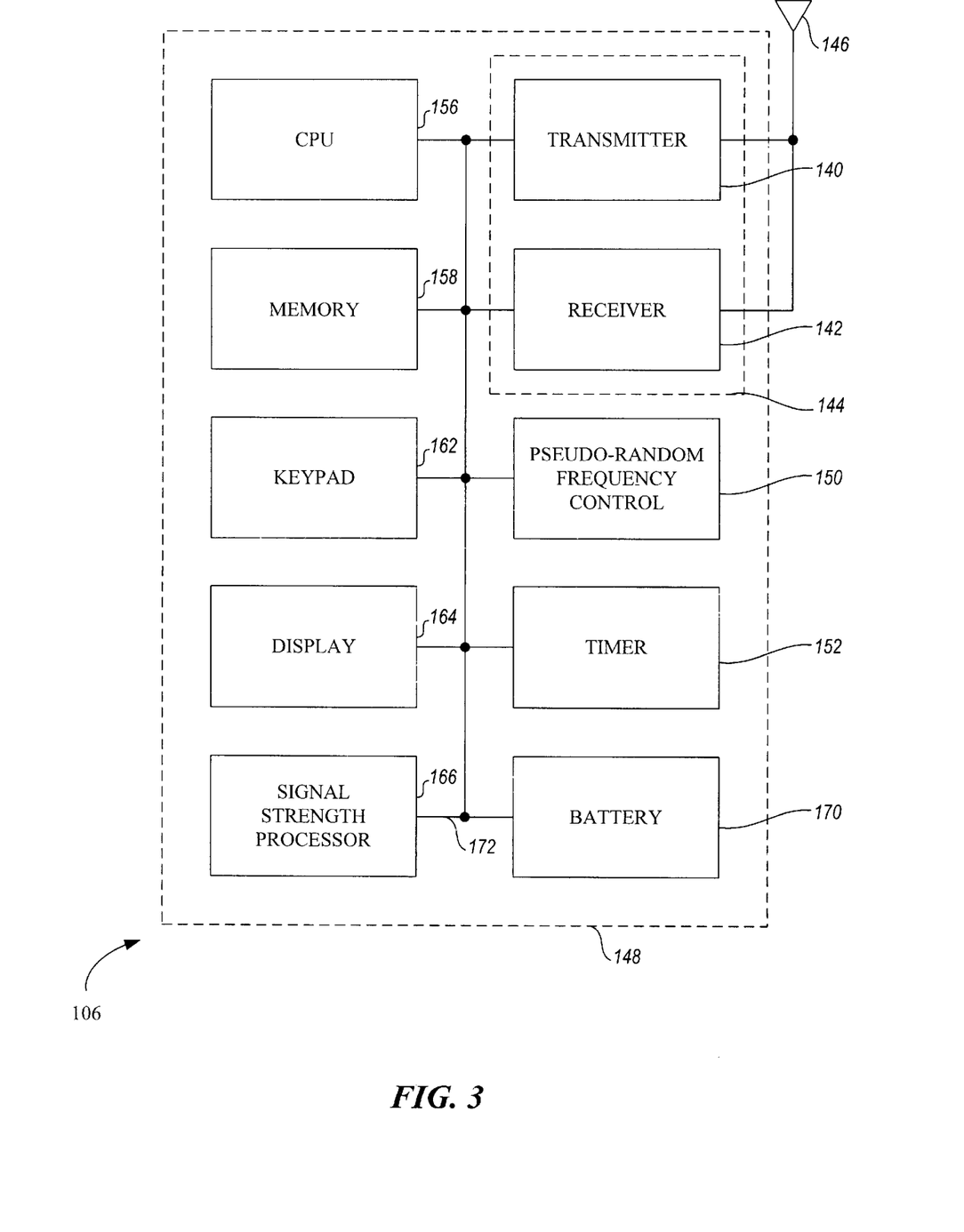
FIG. 3 is a functional block diagram of a handset implementing the present invention.

FIG. 3 is a functional block diagram illustrating the circuit elements of the handset 106. It should be understood that the base station 102 and the handsets 104 and 108 contain identical or similar components. The handset 106 includes a transmitter 140 and a receiver 142. The transmitter 140 and receiver 142 may be combined into a transceiver 144. The transmitter 140 and receiver 142 are coupled to an antenna 146. The transmitter 140 and receiver 142 are contained within a housing 148. The antenna 146 may also be contained within the housing 148 or may extend therefrom in a conventional fashion. The operation of the transmitter 140, receiver 142, and antenna 146 are well known in the art and will be described herein only as each component relates to the specific communication protocol implemented by the system 100.

In an exemplary embodiment, the system 100 is designed for operation in a frequency band reserved for industrial, scientific, and medical use, and referred to by the Federal Communication Commission (FCC) as the "ISM band." In accordance with FCC regulations governing the use of the ISM band, spread spectrum technology is utilized by the system 100. The FCC requires the use of at least 50 or more channels (i.e., frequencies) within the ISM band. In addition, a particular transmitter may operate on a given channel for no more than 0.4 seconds over a 20-second time period. Thus, the FCC regulations require that the transmitter 140 and receiver 142 periodically change the operational frequency. Many known devices operating on the ISM band meet the FCC requirements by changing the operational frequency in accordance with a pseudo-random pattern.

A pseudo-random frequency control 150 is used to program the operational frequency of the transmitter 140 and receiver 12. The pseudo-random frequency control 150 changes the operational frequency in accordance with a pseudo-random pattern at predetermined time intervals. A timer 152 may be used in conjunction with the pseudo-random frequency control 150 to control the operational frequencies of the transmitter 140 and the receiver 12. This process may also be referred to as frequency-hopping. To comply with the FCC requirements, the pseudo-random frequency control 150 generates a 63 count pseudo-random sequence such that the transmitter 140 and receiver 142 frequency-hop among 63 different frequencies. The 63 different frequencies are referred to herein as "channels." Thus, the handsets of the present invention frequency-hop over 63 different channels in a predetermined pseudo-random pattern.

As will be discussed in greater detail below, two handsets that communicate with each other are synchronized during a setup phase of the communication. During the synchronization process, a pseudo-random number generator state is transmitted from one handset to the other. Persons skilled in the art can appreciate that knowledge of the "state" of a random number generator along with the structure of the generator uniquely determine the pattern generated. The pseudo-random frequency control 150 in each of the two handsets utilize the same pseudo-random number generator state to generate an identical pseudo-random sequence for the operational frequencies of the two handsets. In this manner, the two handsets will be synchronized and will frequency-hop in accordance with the same pseudo-random sequence.

For example, FIG. 2 illustrates the handset 106 communicating with the handset 108 via the wireless communication link 128. In the example described below, it will be assumed that the handset 106 is initiating the communication with the handset 108. In an exemplary embodiment of the system 100, the handset that initiates a call (i.e., the handset 106) is designated as the master unit while the handset that receives a call (i.e., the handset 108) is designated as the slave unit only during the period where the wireless communication link 128 (see FIG. 2) is established. If the handset 106 were receiving a call from the handset 108, the handset 106 would be designated as the slave unit and the handset 108 would be designated as the master unit for purposes of that communication. Details of the synchronization process will be provided below.

Many operational functions of the handset 106 may be implemented by a series of computer instructions executed by a central processing unit (CPU) 156. The computer instructions may be stored in a memory 158, which can include read-only memory, random access memory and non-volatile memory. For example, the pseudo-random frequency control 150 can be an independent component or may be implemented by the CPU 156 executing a series of computer instructions from the memory 158. Even if certain functions are implemented by the CPU 156, FIG. 3 illustrates these components as individual blocks since each performs a separate function.

The handset 106 also includes a keypad 162 and an optional display 164. The keypad 162 is used to enter data to control the handset 106. For example, the user may enter an identification number to initiate communication with the handset 108. Each handset includes a unique identification number that may be thought of as its "telephone" number. The user of the handset 106 initiates communication with the handset 108 by entering the "telephone" number of the handset 108. The optional display 164 may be a liquid crystal display (LCD) or other conventional display to display one or more lines of data to the user. In an alternative embodiment, the display 164 may simply be a light-emitting diode (LED) or other indicator used to indicate the status of the handset 106. The keypad 162 and display 164 are attached to the housing 148 to provide accessibility to the user. The operation of the keypad 162 and the display 164 are well known in the art, and will not be described in greater detail herein.

The handset 106 also includes a signal strength processor 166 to measure and provide an indication of the strength of the signal detected by the receiver 12. Any convenient indicator of signal strength can be implemented by the signal strength processor 166. For example, a received signal strength index (RSSI) is commonly used in telecommunications to provide an indication of the power of the received signal. However, the signal strength processor 166 may measure other parameters, such as the amplitude of the received signal, or a current related thereto and provide an indication related to the strength of the received signal. As will be discussed in detail below, the handset 106 will transmit a power change command to the handset 108 to increase power if the strength of the signal detected by the receiver 142 is below a predetermined threshold or a power change command to reduce power if the strength of the signal detected by the receiver is above a second different predetermined threshold.

In a typical implementation, the handset 106 is a mobile unit that is completely powered by a battery 170. In an exemplary embodiment, the battery 170 is contained within the housing 148 or attached to the housing 148 to permit the easy replacement of the battery. The use of the battery allows the handset 106 to be completely self contained. Although the handsets 104–108 may be referred to as "mobile" handsets, the system 100 does not require such mobility. For example, the handset 106 may be used at a fixed location. In this embodiment, the battery 170 may be replaced by an external power supply (not shown) in a well-known conventional manner.

The various components described above and illustrated in FIG. 3 are coupled together by a bus system 172, which may comprise a power bus, a data bus, and a control bus. However, for the sake of clarity, the various buses are illustrated in FIG. 3 as the bus system 172.

Figure 4A:
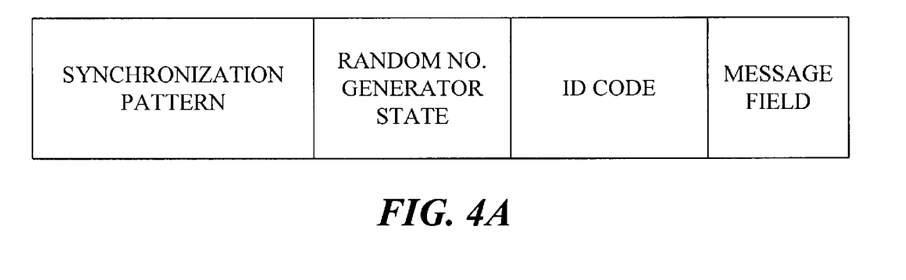
FIG. 4A illustrates the structure of a data frame transmitted by the handsets of the present invention to establish a communication link.

The communication protocol of the system 100 utilizes a series of data frames that are transmitted between handsets. In an exemplary embodiment, two different types of data frames are implemented. A control data frame, illustrated in FIG. 4A, is used to set up and tear down the wireless communication link 128 between the handset 106 and the handset 108. Once the wireless communication link has been set up and the handsets 106 and 108 are properly synchronized, the system 100 employs a message data frame, illustrated in FIG. 4B.

The control data frame of FIG. 4A comprises a synchronization pattern, a random number generator state, an identification (ID) code, and a message field. The bits are modulated and transmitted using conventional frequency shift keying (FSK) modulation techniques. The synchronization pattern allows time and frequency synchronization between the handset 106 and the handset 108.

The handset 106 transmits the control data frame containing the random number generator state thus allowing the handset 108 to synchronize with the handset 106 and to alter the operational frequencies in accordance with the same pseudo-random pattern. The random number generator state is provided to the pseudo-random frequency control 150 (see FIG. 3) of the handset 108 so that the handsets 106 and 108 frequency-hop to new channels in synchronization.

The identification code data field includes identification data of the called party (i.e., the handset 108) and may also include identification for the collection of handsets and the base station 102 (see FIG. 2). Any handset that receives the control data frame will analyze the ID code data field to determine whether the data frame is intended for that particular handset or for another handset. The handset 108 will only respond to control data frames whose ID code corresponds to the identification of the handset 108. Alternatively, all handsets 104–109 may be programmed to respond to a portion of the ID code that is used as a "group identifier." For example, the base station 102 may receive an incoming call from the external network 124 that may not be directed to an individual handset. In this case, the base station 102 transmits the group identifier rather than the ID code for a specific handset. All handsets will respond to the group identifier. The first handset to respond to the group identifier will establish a communication link with the base station 102.

The message field contains variable contents for different messages used to setup and tear down the wireless communication link 128 (see FIG. 2). The contents of the message field will be described in greater detail below.

A number of different messages are sent between the handsets 106 and 108 to set up and tear down the wireless communication link 128 (see FIG. 2). Each of the different messages are sent using the control data frame (see FIG. 4A) with different data contained within the message field. Table 1 below provides a list of control field commands used in the control data frame. As can be appreciated by those skilled in the art, the control field may include additional commands. Furthermore, a portion of the 16-bit control data field may be used for a CRC or other form of error detection and/or correction within the control data field.

TABLE 1

CONTROL FIELD COMMANDS

| | |
|---|---|
| 1. NULL | (Null Message) |
| 2. CALL_ALERT | (Transmitted by calling unit) |
| 3. CALL_SET_UP | (Transmitted by called unit) |
| 4. ACK | (Transmitted by calling unit) |
| 5. CALL_TEAR_DOWN | (Transmitted by called unit) |

The handset 106 initiates a request to communicate by transmitting one or more control data frames with the message field containing a CALL_ALERT command. As discussed above, the handsets operate over 63 different channels in the ISM band. The handset 106 is capable of transmitting this data frame over any of the 63 channels. However, in a presently preferred embodiment, the handset 106 initially transmits the control data frames with the CALL_ALERT command on a selected subset of 63 channels. Specifically, the handset 106 periodically transmits the control data frame with the CALL_ALERT command at a different one of 16 acquisition channels. The handset 108 scans the sixteen acquisition channels to determine if a control data frame with the CALL_ALERT command has been transmitted to the handset. The use of a limited pool of acquisition channels or frequencies allows the handsets 106 and 108 to synchronize more rapidly than would occur if the entire pool of 63 channels were used. The fast acquisition process will be described in detail below.

If the handset 108 detects the control data frame and the ID code data field matches the ID code of the handset 108, the handset alerts the user that an incoming call has been detected. The alert signal may be audible (e.g., a ring signal), visual (e.g., a flashing light), tactile (e.g., a vibrator), or the like. If the called party responds to the alert signal by activating the handset 108, the handset 108 transmits a control data frame with the message field containing a CALL_SET_UP command. In response to the CALL_SET_UP command, the calling handset 106 transmits a control data frame with the message field containing an ACK message. The handsets 106 and 108 may exchange one or more additional data frames, if necessary to complete synchronization and to establish the appropriate frequency-hopping pseudo-random pattern.

Figure 4B:
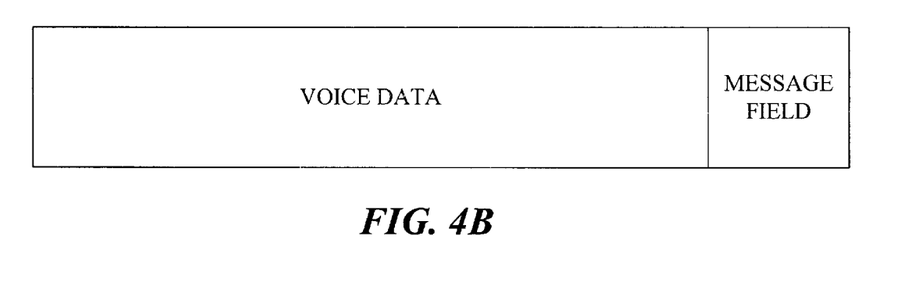
FIG. 4B illustrates the structure of a data frame transmitted by the handsets of the present invention when a communication link has been established.

Once the synchronization process is complete and the wireless communication link 128 established, the handsets 106 and 108 transmit a plurality of message data frames, illustrated in FIG. 4B to allow voice communication between the users of the two handsets. Additional details of the message data frame are provided below. Following the completion of voice communication between the users of the handsets 106 and 108, one of the users will "hang up" by pressing an END button or similar button on the keypad 162 (see FIG. 3) causing both handsets to stop sending message data frames and to tear down the communication link. The called unit (i.e., the handset 108) transmits a control data frame with the control field containing the CALL_TEAR_DOWN command. In response to the CALL_TEAR_DOWN command, the calling unit (i.e., the handset 106) transmits a control data frame with the control field containing an ACK message command. Thus, the handsets 106 and 108 exchange a number of control data frames and message data frames in accordance with the communication protocol of the present invention.

In an exemplary embodiment, the transmitter 140 (see FIG. 3) transmits approximately 250 data frames per second (i.e., approximately 1 data frame every 4 milliseconds). The handset 106 will continuously transmit control data frames containing the CALL_ALERT command with each control data frame being transmitted on a different one of the 16 acquisition channels. That is, the first control data frame is transmitted on the first acquisition channel, the second control data frame is transmitted on the second acquisition channel, the third control data frame is transmitted on the third acquisition channel, and so forth. This process is repeated using the 16 acquisition channels until the data frame containing the CALL_hd —ALERT command is detected by the handset 108 or until predetermined time limits are reached. The handset 108 monitors the 16 acquisition channels until a data frame is detected with the ID code data field that matches the identification of the handset 108. This indicates an incoming call for the handset 108. In an exemplary embodiment, idle handsets operate using sleep cycles and awake cycles to conserve battery power. In a sleep cycle, the handset 108 is inactive for approximately 1.28 seconds, which corresponds to 320 data frames. During an awake cycle, the handset 108 is awake for approximately 160 milliseconds (mSec), which corresponds to 40 data frames. Because the handset 106 transmits the control data frame with the CALL_ALERT command on each of the 16 acquisition channels, the handset 108 will have more than two chances to detect the control data frame before going into its next sleep cycle. If the data frame from the handset 106 is not detected, the handset 108 goes into a sleep cycle for another 1.28 seconds (320 data frames). During the next awake cycle, the handset 108 switches to a second one of the 16 acquisition channels and stays awake for an additional 40 frames.

This process is continuously repeated by all idle handsets until a control data frame is detected. If the detected data frame is intended for another handset, the transmitted ID code will not match. In that event, the handset ignores the data frame and returns to the sleep cycle at the appropriate point in time. If the handset 108 is out of range of the handset 106, no data frames will be detected. The handset 106 will timeout at 16 seconds and terminate attempts to establish the wireless communication link 128. However, under normal circumstances, the handset 108 will detect the control data frame with the CALL_ALERT command and determine that the handset 106 is attempting to establish the wireless communication link 128. When the handset 108 detects the control data frame with the matching ID code, the handset remains in the awake cycle.

The synchronization pattern (see FIG. 4A) allows synchronization between the handsets 106 and 108. The random number generator state contained within the control data frame allows the handset 108 to synchronize frequency-hopping with the handset 106. The handset 106 will transmit only on the 16 acquisition channels for a predetermined period of time and subsequently switch to the entire pool of 63 channels where the specific channel is selected in accordance with the pseudo-random pattern. The handset 108 will simultaneously switch to 63 channels and synchronize in time and frequency with the handset 106.

The handsets 106 and 108 exchange a number of control data frames in the manner described above. That is, the handset 106 transmits a control data frame containing the CALL_ALERT command. The handset 108 transmits a control data frame containing the CALL_SET_UP command followed by a control data frame transmitted from the handset 106 with the ACK message. Once the control data frame containing the ACK message has been received by the handset 108, the wireless communication link 128 has been established. The handsets 106 and 108 can now exchange voice data utilizing the message data frame illustrated in FIG. 4B.

The message data frame of FIG. 4B comprises a voice data field, and a message data field. The voice data field contains a digitized form of an audio signal. As can be appreciated by those skilled in the art, the audio signal is digitized using conventional analog-to-digital conversion techniques and transmitted as digital data in a plurality of message data frames. When the message data frames are received, the digital data is converted back to an analog signal using conventional digital-to-analog conversion techniques. The digitization of the audio signal and conversion of the digital data back to analog form are well known in the art and will not be described further herein.

The system 100 also permits the control of power transmitted by the base station 102 and each of the handsets 104–108. As can be appreciated by those skilled in the art, it is desirable to operate the transmitter 140 (see FIG. 3) at the lowest power level to minimize power drain on the battery 170 and to minimize potential interference with other wireless units. The transmitter 140 must transmit at a sufficient power level to assure adequate communication capability via the wireless communication link 128. Unlike prior art systems where the master unit (i.e., the base station) always transmits at maximum power, the system 100 allows both handsets 106 and 108 to control each other's power regardless of the master-slave designation of any unit. Furthermore, handsets (e.g., the handset 104) can control the power of the base station 102 (see FIG. 2).

The base station 102 (see FIG. 2) or any of the handsets 104–108 can generate a command to alter the power of the unit with which it is communicating. For example, if the handset 108 is transmitting at a signal level greater than necessary for adequate reception, the signal strength processor 166 (see FIG. 3) in the handset 106 detects the excessive signal level. As discussed above, the signal strength processor 166 may conveniently utilize the RSSI known in telecommunications, or other measure of signal level, to determine the level of the signal detected by the receiver 12. If the signal level exceeds a first predetermined threshold, the handset 106 will transmit a reduce power command using the message data field of the message data frame. The handset 108 reduces the output power of its transmitter in response to the reduce power command. Each message data frame, illustrated in FIG. 4B, allows a message data field.

Similarly, if the signal strength processor 166 of the handset 106 determines that the receiver 142 is detecting a signal level that is below a second predetermined threshold, the handset 106 transmits a power increase command. If the signal level is below the second predetermined threshold, the handset 106 will transmit an increase power command using the message data field of the message data frame.

Either user can terminate the call by "hanging up." Activation of a button on the keypad 162 (see FIG. 3), such as an "END" button, can initiate the termination of the call. When END button has been activated by either user, the handsets 106 and 108 will cease transmitting message data frames and will exchange a number of control data frames to tear down the wireless communication link 128. The wireless communication link 128 is torn down when the handset 108 transmits a control data frame containing a CALL_TEAR_DOWN command within the message field (see FIG. 4A and Table 1). The handset 106 responds within a control data frame containing an ACK message in the message field. At this point, the wireless communication link 128 no longer exists, and the handsets 106 and 108 are returned to the idle mode. As discussed above, any handset in the idle mode alternates between the sleep cycle and the awake cycle.

Thus, the system 100 allows direct communication between two handsets. No interaction is required with the base station 102 (see FIG. 2). It should be noted that the base station 102 is coupled to the external network 124. All communications with the external network 124 must be conducted via the base station 102. This is illustrated in FIG. 2 where the handset 104 is coupled to the base station 102 via the wireless communication link 122. However, the base station 102 also operates in accordance with the principles of the present invention. That is, the base station 102 is a slave unit if the handset 104 initiates the call to the base station. Conversely, the base station 102 functions as the master unit if the base station initiates the call to the handset 104. Thus, the base station 102 functions in a manner identical to any of the handsets (e.g., the handsets 104–108) with the exception of having an additional connection to the external network 124. However, this additional functionality does not require that the base station 102 have a fixed designation as a master unit. The variable master-slave relationship of the system 100 allows great flexibility in the system 100. Such variable designation allows handsets to communicate directly with each other rather than relay communications via a fixed master unit.

Figure 5A:
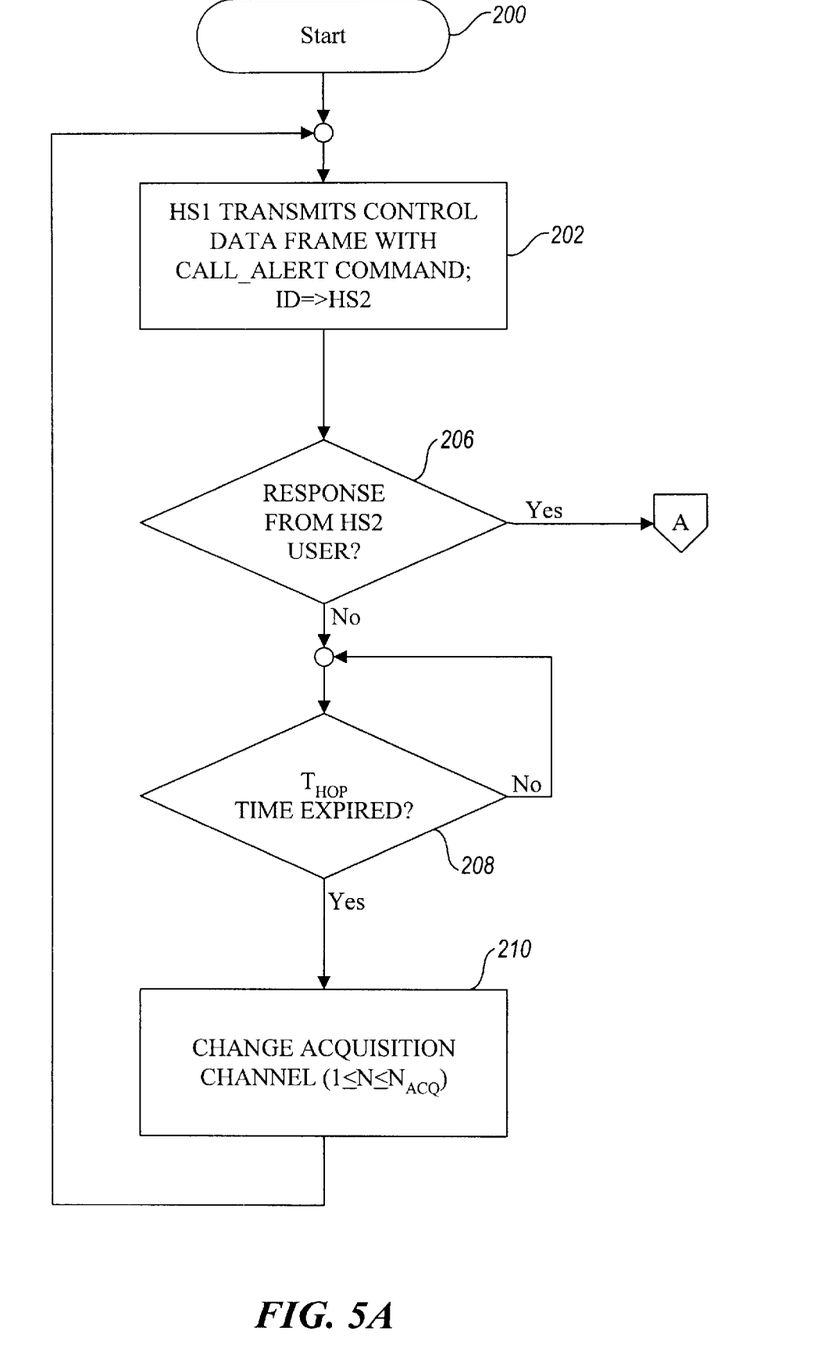
FIGS. 5A–5C together form a flowchart illustrating the operation of the handsets of the present invention to establish and maintain a communication link.
Figure 5B:
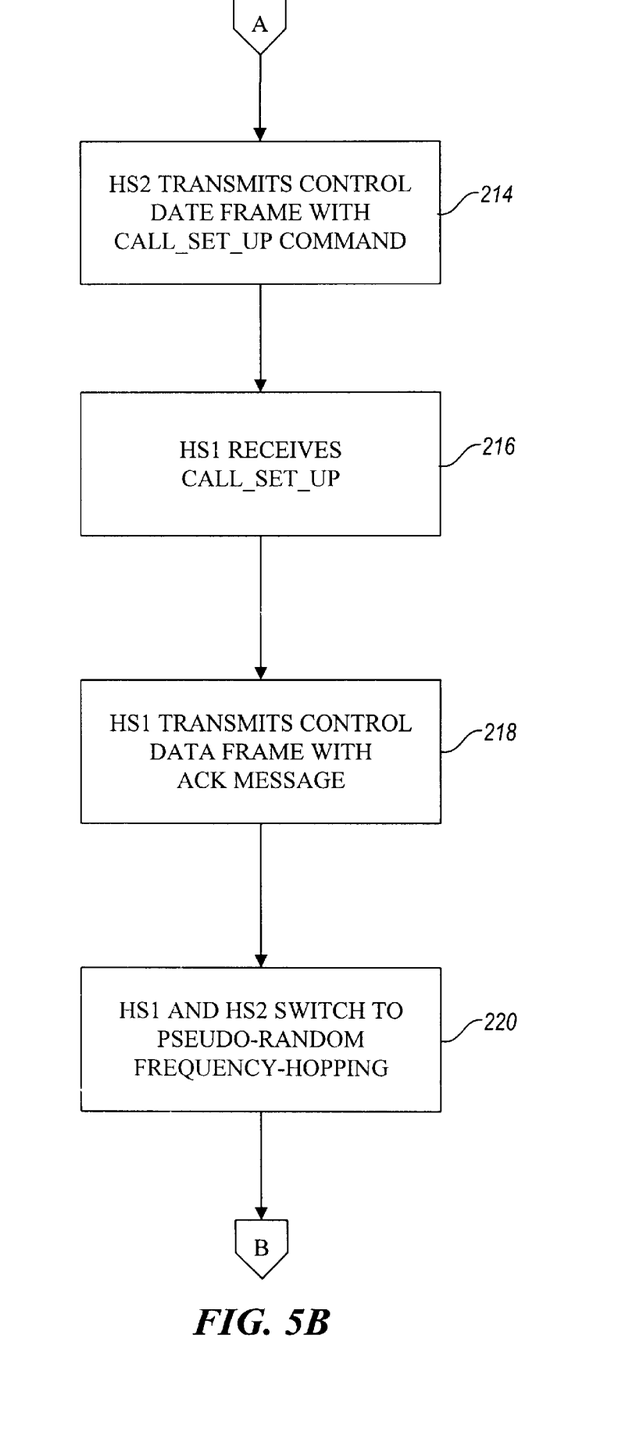
Figure 5C:
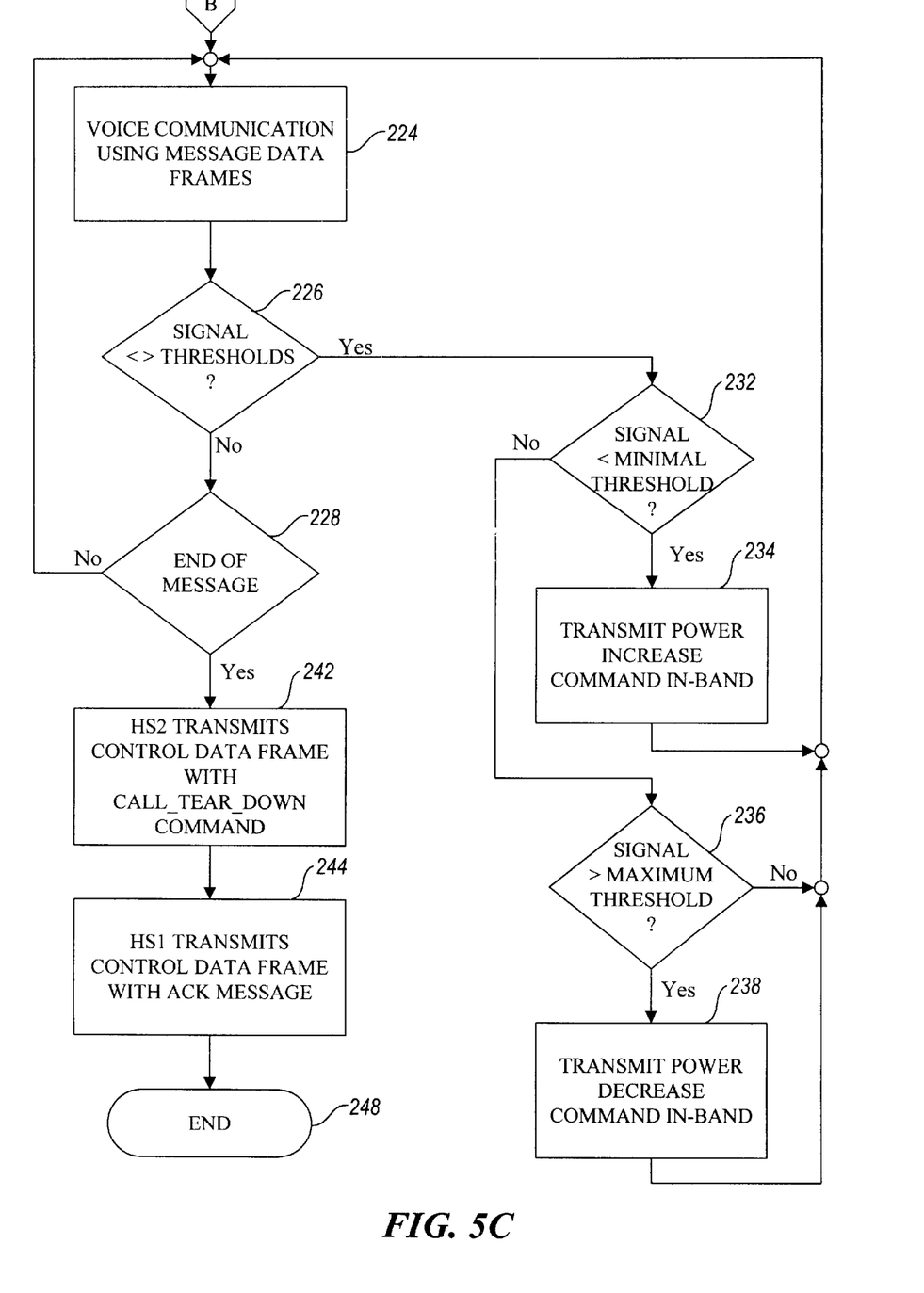

The operation of the system 100 using the above-described communication protocol is outlined in the flowchart of FIGS. 5A–5C. At a start 200 it is assumed that the handsets and/or base station are under power. In step 202 a handset, designated herein as HS1 (e.g., the handset 106) transmits a control data frame containing the CALL_ALERT command and containing the identification data corresponding to a second handset, designated as HS2 (e.g., the handset 108). As described above, the handset HS1 transmits the control data frame on a selected one of the 16 acquisition channels. Although the presently preferred embodiment utilizes 16 acquisition channels, the communication protocol of the present invention can be successfully implement with greater than or less than 16 acquisition channels.

In decision 206, the system 100 determines whether there is a response from the user of the handset HS2. If the control data frame has been received by the handset HS2, time and frequency synchronization will occur in the manner described above and the ringer or other indicator in the handset HS2 will alert the user of an incoming call. If the user responds to the alert, the result of decision 206 is YES. In that event, the process continues on FIG. 5B.

If there is no response from the user of the handset HS2, the result of decision 206 is NO. Such a result can occur under several circumstances. First, the handset HS2 may be turned off or out of range such that the control data frame is simply not received. Secondly, the handset HS2 may be currently engaged in communication with another handset (not shown) and therefore will not detect the control data frame on one of the 16 acquisition channels. Finally, the handset HS2 may detect the incoming data frame and alert the user, but the user simply elects not to answer. Under any of these circumstances, the result of decision 206 is NO.

If there is no response from the handset HS2, the system 100 moves to decision 208 to determine whether a timer $T_{hop}$ has expired. As previously noted, FCC regulations require that communication in the ISM band is time limited on any particular channel. If the timer $T_{hop}$ has not expired, the result of decision 208 is no and the system returns to decision 208 until the timer $T_{hop}$ has expired. If the timer $T_{hop}$ has expired, the result of decision 208 is YES. In that event, in decision 210, the transmitter 140 (see FIG. 3) and the receiver 142 increment the operational frequency to the next selected one of the acquisition channels. Following the completion of step 210, the system 100 returns to step 202 where the handset HS1 transmits the control data frame with CALL_ALERT command on the next acquisition channel. As discussed above, this process is repeated such that the handset HS1 transmits a control data frame on each of the 16 acquisition channels. Furthermore, if the handset HS2 does not respond within an additional predetermined time period (e.g., 16 seconds), the handset HS1 will terminate the attempt to establish the wireless communication link 128 (see FIG. 2).

If the user responds to the control data frame containing the CALL_ALERT command, the result at decision 206 is YES and, in step 214, illustrated in FIG. 5B, the handset HS2 transmits a control data frame containing the CALL_SET_UP command. In step 216, the handset HS1 receives the CALL_SET_UP command and, in step 218, transmits a control data frame containing the ACK message.

In step 220, both the handsets HS1 and HS2 switch to a pseudo-random frequency hopping over 63 channels. The process of frequency hopping is well known in the art, and need not be described in further detail. It is further noted that the FCC regulations require frequency hopping over at least 50 channels. Although the presently preferred embodiment of the invention utilizes 63 channels, those skilled in the art will recognize that the system 100 may be implemented with more or fewer than 63 channels.

At this point in time, the wireless communication link (e.g., the wireless communication link 228 in FIG. 2) has been established between the handsets HS1 and HS2. In step 224, illustrated in FIG. 5C, voice communications may now be exchanged between the handsets HS1 and HS2 using message data frames, illustrated in FIG. 4B. The message data frames include in-band signaling for control purposes. The in-band signaling may be used to control the power of the transmitters 140 (see FIG. 3) in the handsets HS1 and HS2. In decision 226, the signal strength processor 166 determines whether the detected signal is above or below predetermined thresholds. If the detected signal is not above or below the predetermined thresholds (i.e., the detected signal is within an acceptable range of levels), the result of decision 226 is NO. In that event, in decision 228, the system 100 determines whether the communication between the handsets HS1 and HS2 is being terminated. If the communication is not being terminated, the result of decision 228 is NO and the system returns to step 224 to continue voice communication using the message data frames.

As previously discussed, the symmetrical communication protocol of the present invention allows either handset to adjust the transmission power of the other handset. If the detected signal is above or below the predetermined threshold, the result of decision 226 is YES. In that event, in decision 232, the receiving handset (e.g., the handset 108) determines whether the detected signal is below a minimum threshold. If the detected signal is below a minimum threshold, the result of decision 232 is YES. In that event, in step 234 the handset (e.g., the handset 108) transmits an in-band signaling command in the message field to the other handset (e.g., the handset 106) to increase transmission power.

If the detected signal is not below the minimum threshold, the result of decision 232 is NO and in decision 236 the handset (e.g., the handset 108) determines whether the detected signal is above a maximum threshold. If the detected signal is not above the maximum threshold, no adjustments are necessary. However, if the detected signal is above the maximum threshold, the result of decision 236 is YES. In that event, in step 238, the handset (e.g., the handset 108) transmits a decrease power command to the other handset (e.g., the handset 106) to decrease transmission power. If the transmission power is adjusted in steps 234 or 238, or requires no adjustment, the system returns to step 224 so that voice communications may continue using a plurality of message data frames.

At some point in time, one user will terminate the call by pressing the "END" button or similar button on the keypad 162 (see FIG. 3) of one of the handsets. As a result of the user termination, the result of decision 228 will be YES. In that event, in step 242 the handset HS2 transmits a control data frame containing the CALL_TEAR_DOWN command. In step 244, the handset HS1 transmits a control data frame containing the ACK message and the process ends at 248 with both handsets HS1 and HS2 being placed in the idle mode having awake and sleep cycles as described above.

The description above is directed to communication between two handsets HS1 and HS2. However, communications with the base station 102 (see FIG. 2) occurs in an identical manner. That is, the base station 102 acts as a master only when initiating calls to a handset. If a handset (e.g., the handset 104) is initiating a call to the base station 102, the handset functions as the master and the base station functions as the slave. Furthermore, the handsets and/or base station can control the transmission power of the unit with which it is communicating irrespective of the master-slave relationship.

Figure 6:
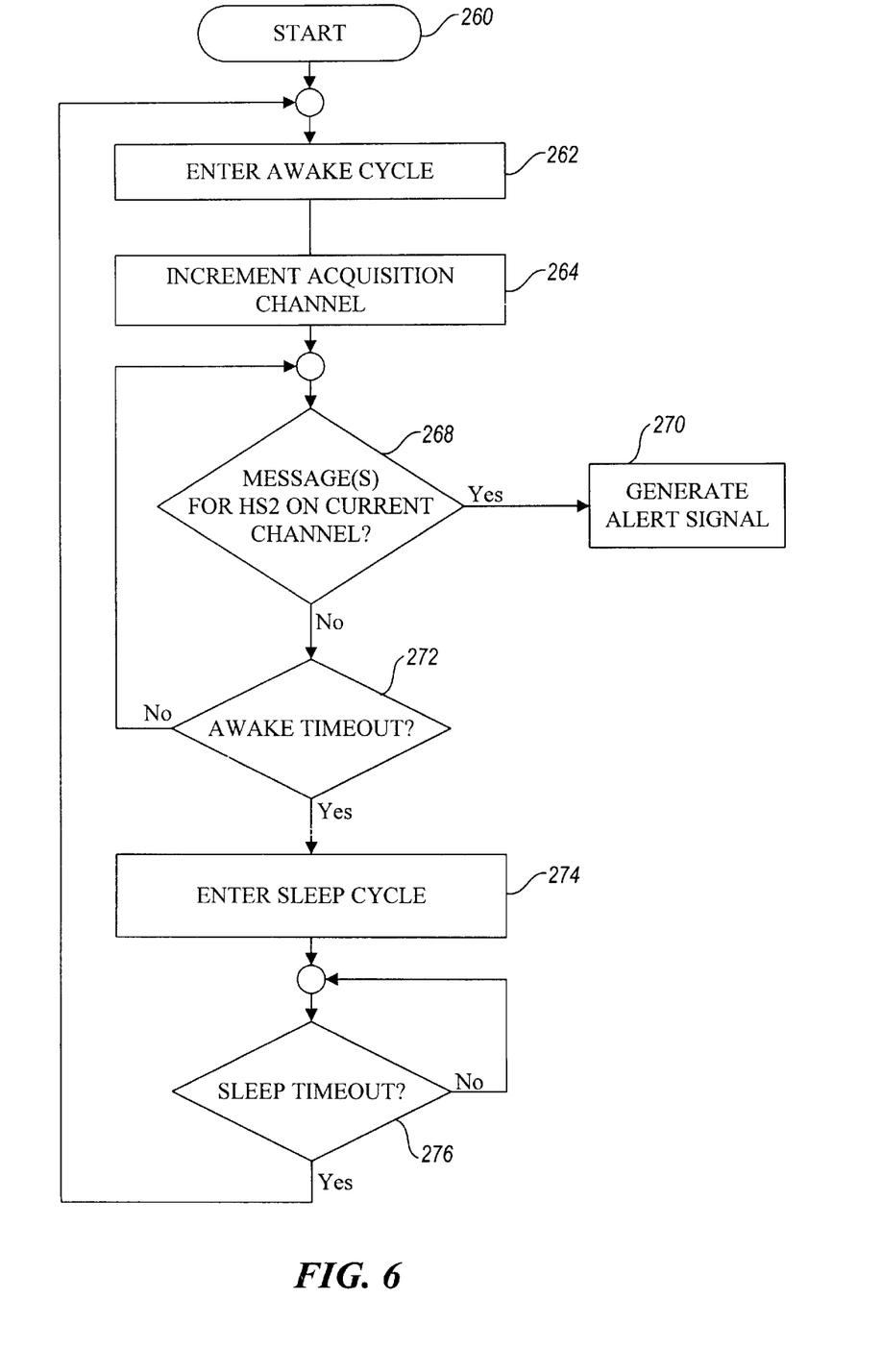
FIG. 6 is a flowchart of the operation of a receiving handset operating in accordance with the principles of the present invention.

FIG. 6 is a flowchart illustrating the operation of an idle handset that detects an incoming call. At a start 260 the handset HS2 is assumed to be in a sleep cycle. In step 262, the handset HS2 enters the awake cycle. In step 264, the handset increments the acquisition channel and in decision 268, determines whether any incoming messages for the handset HS2 are detected on the present acquisition channel. If a message for the handset HS2 is detected, the result of decision 268 is YES. In that event, in step 270, the handset HS2 generates an alert signal (e.g., a ring signal) to alert the user to the incoming call. Subsequent processing of the incoming call has previously been described with respect to FIGS. 5A–5C and will not be repeated herein.

If the handset HS2 does not detect any incoming messages, the result of decision 268 is NO. In that event, in decision 272 the handset HS2 determines whether the awake timeout period has been exceeded. If the awake timeout period has not been exceeded, the result in decision 272 is NO and the handset HS2 returns to decision 268 in an attempt to detect an incoming message. If the awake timeout period has been exceeded, the result of decision 272 is YES. In that event, the handset HS2 enters the sleep cycle in step 274. In decision 276 the handset HS2 determines whether the sleep timeout timer has expired. If the sleep timeout timer has not expired, the result of decision 276 is NO and the handset HS2 returns to decision 276 and remains in the sleep cycle. If the sleep timeout timer has expired, the result of decision 276 is YES. In that event, the handset HS2 returns to step 262 and enters the awake cycle. In this manner, the handset HS2 conserves battery power by remaining in the sleep cycle and only periodically entering the awake cycle. During each awake cycle, the handset HS2 switches to a different one of the 16 acquisition channels and remains at that acquisition channel until it detects a data frame intended for it or until it reenters the sleep cycle. As noted above, the handset HS2 remains in the awake cycle for a period of time sufficient to detect a plurality of data frames from another handset.

Thus, the system 100 offers a unique communication protocol that allows point-to-point communication between handsets without any intervention by a base station. The handsets are capable of operation as a master unit or a slave unit depending on whether a call is being initiated or received. Furthermore, the handsets are capable of symmetric power control where either handset can transmit power control commands to the other handset.

It is to be understood that even though various embodiments and advantages of the present invention have been set forth in the foregoing description, the above disclosure is illustrative only, and changes may be made in detail, yet remain within the broad principles of the invention. Therefore, the present invention is to be limited only by the appended claims.

What is claimed is:

1. A wireless communication system, comprising:
    a first transmitter in a first wireless communication unit to transmit data to a second wireless unit, the first transmitter operating at a selected frequency to transmit a request to communicate with the second wireless unit;
    a first receiver in the first wireless communication unit to receive data from the second wireless unit;
    a second receiver in the second wireless unit monitoring the selected frequency to thereby detect the request to communicate transmitted from the first wireless unit;
    a second transmitter to transmit a response signal to the first wireless unit to indicate reception of the request to communicate, the first and second wireless units thereby establishing a communication link with the first wireless unit functioning as a master unit and the second wireless unit functioning as a slave unit;
    a first signal monitor in the first wireless unit coupled to the first receiver and determining a first received signal strength indicative of a strength of the signal received from the second wireless unit, the first transmitter transmitting a power change request signal to the second wireless unit if the first received signal strength is above or below a first set of predetermined limits; and
    a second signal monitor in the second wireless unit coupled to the second receiver and determining a second received signal strength indicative of a strength of the signal received from the first wireless unit, the second transmitter transmitting a power change request signal to the first wireless unit if the second received signal strength is above or below a second set of predetermined limits.

2. The system of claim 1, further including a base station coupled to a switched telephone network and having a base station transmitter and a base station receiver wherein the first and second wireless units communicate via the switched telephone network by transmitting data to and receiving data from the base station.

3. The system of claim 2 wherein the base station is coupled to a public switched telephone network.

4. The system of claim 1 wherein the first transmitter and the second receiver are programmable for operation at a plurality of different frequencies, the first transmitter transmitting the request to communicate at a selected one of the plurality of frequencies, the second receiver being programmed for operation at the plurality of frequencies, including the selected frequency, to detect the request to communicate transmitted by the first wireless unit.

5. The system of claim 4 wherein the first transmitter periodically transmits the request to communicate, each of the plurality of periodic transmissions occurring at a different one of the plurality of different frequencies.

6. The system of claim 4 wherein the first transmitter is initially programmed for operation at a subset of the plurality of different frequencies and periodically transmits the request to communicate, each of the plurality of periodic transmissions occurring at a different one of the subset of different frequencies.

7. The system of claim 6 wherein the first transmitter is programmed for operation at a subset of the plurality of different frequencies for an initial time period and is subsequently programmed for operation at the plurality of different frequencies, the transmitter periodically transmitting the request to communicate at a different one of the subset of different frequencies for the initial period of time and, subsequent to the initial period of time, periodically transmitting the request to communicate at a different one of the plurality of different frequencies.

8. The system of claim 1 wherein the first and second transmitters and the first and second receivers are programmable for operation at a plurality of different frequencies, the communication link between the first and second wireless units being established by periodically programming the first and second transmitters and the first and second receivers for operation at a different one of the plurality of frequencies, whereby the first and second transmitters and the first and second receivers are all operating at the same frequency and periodically all change to a different frequency.

9. The system of claim 8 wherein the different ones of the plurality of frequencies for the first and second transmitters and the first and second receivers are selected based on a pseudo-random sequence, where by the first and second transmitters and the first and second receivers are all operating at the same frequency and periodically all change to a different frequency in accordance with a pseudo-random pattern.

10. The system of claim 1 wherein the first and second sets of predetermined limits are identical.

11. The system of claim 1 wherein the request to communicate is contained within a data frame transmitted from the first wireless unit to the second wireless unit.

12. The system of claim 11 wherein the first data frame further comprises an identification data field to indicate the second wireless unit as a called party.

13. The system of claim 1 wherein the first transmitter transmits the power change request signal within a data frame transmitted from the first wireless unit to the second wireless unit.

14. The system of claim 1 wherein the first and second transmitters transmit a plurality of data frames to the second and first receivers, respectively, while the communication link is established.

15. The system of claim 14 wherein the first transmitter transmits the power change request signal within a data frame transmitted from the first wireless unit to the second wireless unit after the communication link has been established, said power change request signal being transmitted in at least one of the plurality of data frames transmitted while the communication link is established.

16. A wireless communication system to control communication between first and second wireless units, comprising:

a first transmitter in the first wireless communication unit to transmit data to the second wireless unit, the first transmitter operating at a selected frequency to transmit a request to communicate with the second wireless unit;

a first receiver in the first wireless communication unit to receive data from the second wireless unit;

a second receiver in the second wireless unit monitoring the selected frequency to thereby detect the request to communicate transmitted from the first wireless unit;

a second transmitter to transmit a response signal to the first wireless unit to indicate reception of the request to communicate, the first and second wireless units thereby establishing a communication link with each other;

a first signal monitor in the first wireless unit coupled to the first receiver and determining a first received signal strength indicative of a strength of the signal received from the second wireless unit, the first transmitter transmitting a power change request signal to the second wireless unit if the first received signal strength is above or below a first set of predetermined limits; and a second signal monitor in the second wireless unit coupled to the second receiver and determining a second received signal strength indicative of a strength of the signal received from the first wireless unit, the second transmitter transmitting a power change request signal to the first wireless unit if the second received signal strength is above or below a second set of predetermined limits.

17. The system of claim 16 wherein the first and second sets of predetermined limits are identical.

18. The system of claim 16 wherein the first transmitter transmits the power change request signal within a data frame transmitted from the first wireless unit to the second wireless unit.

19. The system of claim 16 wherein the first and second transmitters transmit a plurality of data frames to the second and first receivers, respectively, while the communication link is established.

20. The system of claim 19 wherein the first transmitter transmits the power change request signal within a data frame transmitted from the first wireless unit to the second wireless unit after the communication link has been established, said power change request signal being transmitted in at least one of the plurality of data frames transmitted while the communication link is established.

21. The system of claim 16 wherein the request to communicate Is contained within a data frame transmitted from the first wireless unit to the second wireless unit.

22. The system of claim 21 wherein the first data frame further comprises an identification data field to indicate the second wireless unit as a called party.

23. A method to control communication between first and second wireless units in a wireless communication system, the method comprising:

transmitting, at a selected frequency, a request to communicate with the second wireless unit from the first wireless communication unit;

monitoring the selected frequency to thereby detect the request to communicate transmitted from the first wireless unit;

transmitting, at the selected frequency, a response signal from the second wireless unit to the first wireless communication unit to thereby establish a communication link between the first wireless unit and the second wireless unit with the first wireless unit functioning as a master unit and the second wireless unit functioning as a slave unit;

determining a first received signal strength indicative of a strength of the signal received from the second wireless unit;

transmitting a power change request signal from the first wireless unit to the second wireless unit if the first received signal strength is above or below a first set of predetermined limits;

determining a second received signal strength indicative of a strength of the signal received from the first wireless unit; and transmitting a power change request signal from the second wireless unit to the first wireless unit if the second received signal strength is above or below a second set of predetermined limits.

24. The method of claim 23 wherein a selected one of the first and second wireless units is coupled to an external telephone network, the method further including communicating via the external telephone network by relaying data between the external telephone network and the selected one of the first and second wireless units coupled to the external telephone network.

25. The method of claim 24 wherein the external telephone network is a public switched telephone network.

26. The method of claim 23 wherein the first and second wireless units are programmable for operation at a plurality of different frequencies, the first wireless unit transmitting the request to communicate at a selected one of the plurality of frequencies, the second wireless unit being programmed for operation at the plurality of frequencies, including the selected frequency, to detect the request to communicate transmitted by the first wireless unit.

27. The method of claim 26 wherein the first wireless unit is initially programmed for operation at a subset of the plurality of different frequencies and periodically transmits the request to communicate, each of the plurality of periodic transmissions occurring at a different one of the subset of different frequencies.

28. The method of claim 27 wherein the first wireless unit is programmed for operation at a subset of the plurality of different frequencies for an initial time period and is subsequently programmed for operation at the plurality of different frequencies, the first wireless unit periodically transmitting the request to communicate at a different one of the subset of different frequencies for the initial period of time and, subsequent to the initial period of time, periodically transmitting the request to communicate at a different one of the plurality of different frequencies.

29. The method of claim 23 wherein the first and second wireless units are programmable for operation at a plurality of different frequencies, the communication link between the first and second wireless units being established by periodically programming the first and second wireless units at a different one of the plurality of frequencies, whereby the first and second first wireless units are both operating at the same frequency and periodically both change to a different frequency.

30. The method of claim 23 wherein the first and second sets of predetermined limits are identical and the steps of transmitting the power change request signal from the first wireless unit to the second wireless unit and transmitting the power change request signal from the second wireless unit to the first wireless unit uses the identical predetermined limits.

31. The method of claim 23 wherein the first wireless unit transmits the power change request signal to the second wireless unit within a data frame transmitted from the first wireless unit to the second wireless unit.

32. The method of claim 23 wherein the first and second wireless units transmit a plurality of data frames to each other while the communication link is established.

33. The method of claim 32 wherein the first wireless unit transmits the power change request signal within a data frame transmitted from the first wireless unit to the second wireless unit after the communication link has been established, said power change request signal being transmitted in at least one of the plurality of data frames transmitted while the communication link is established.

* * * * *